C. L. HEYERMANS.
SELF PROPELLED VEHICLE.
APPLICATION FILED JULY 20, 1917.
1,305,105.
Patented May 27, 1919.
3 SHEETS—SHEET 1.
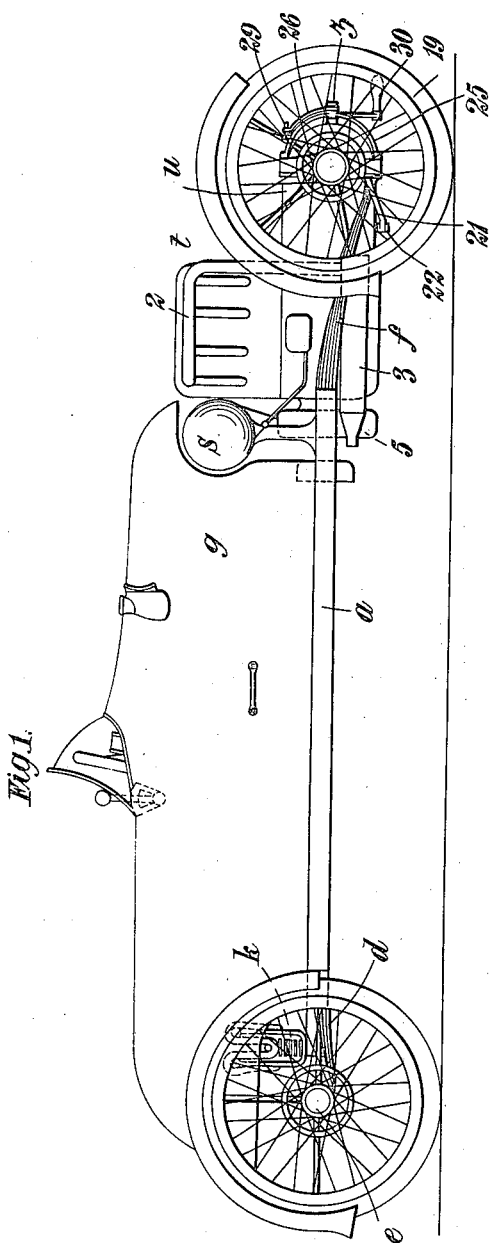
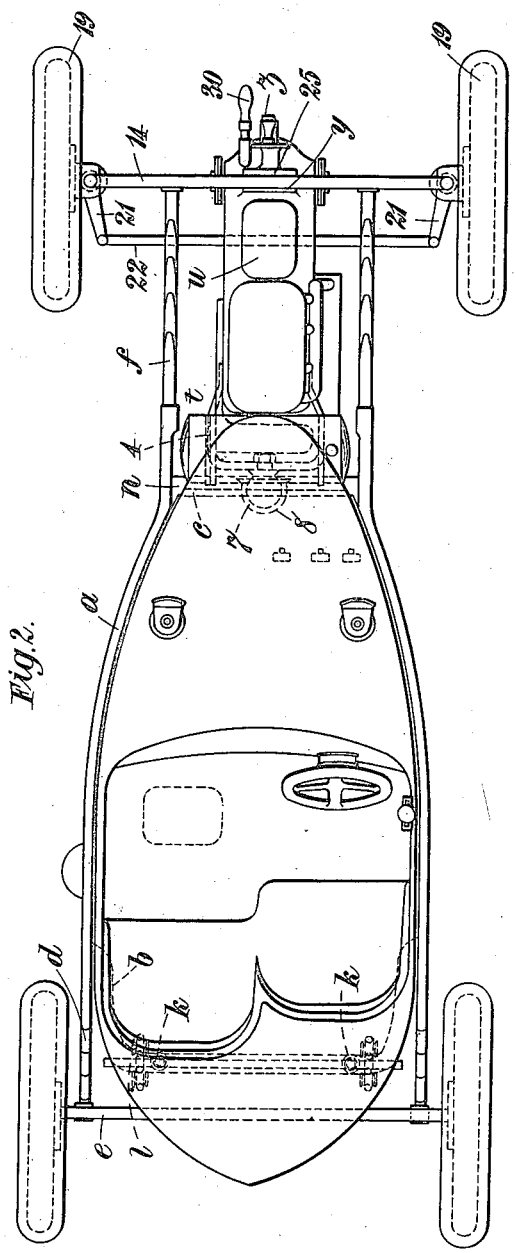
INVENTOR
Charles Louis Heyermans
BY
ATTORNEY C. L. HEYERMANS.
SELF PROPELLED VEHICLE.
APPLICATION FILED JULY 20, 1917.
1,305,105.
Patented May 27, 1919.
3 SHEETS—SHEET 2.
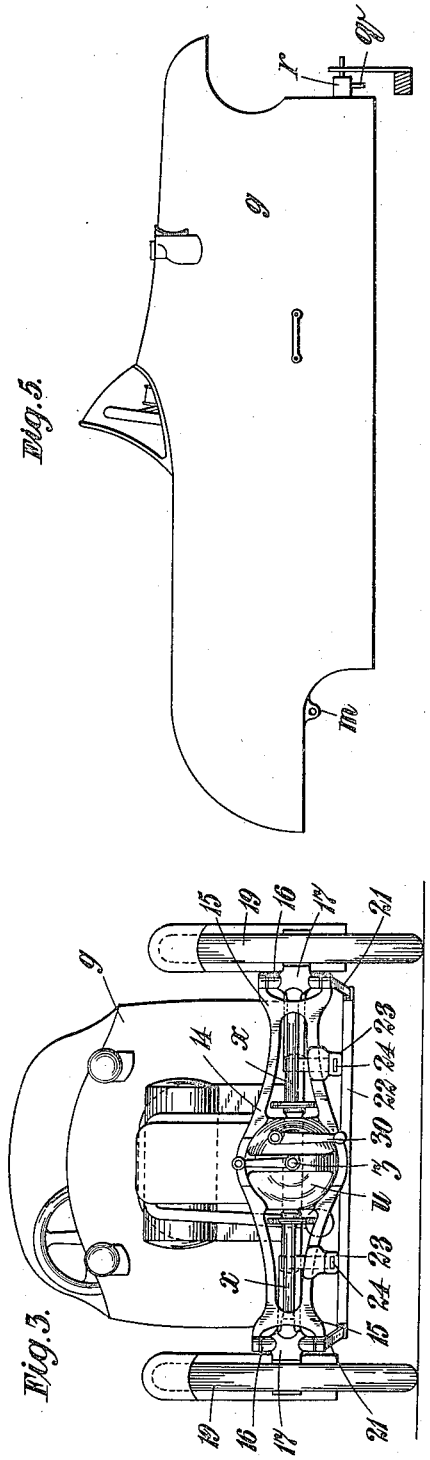
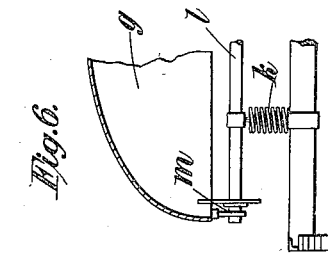
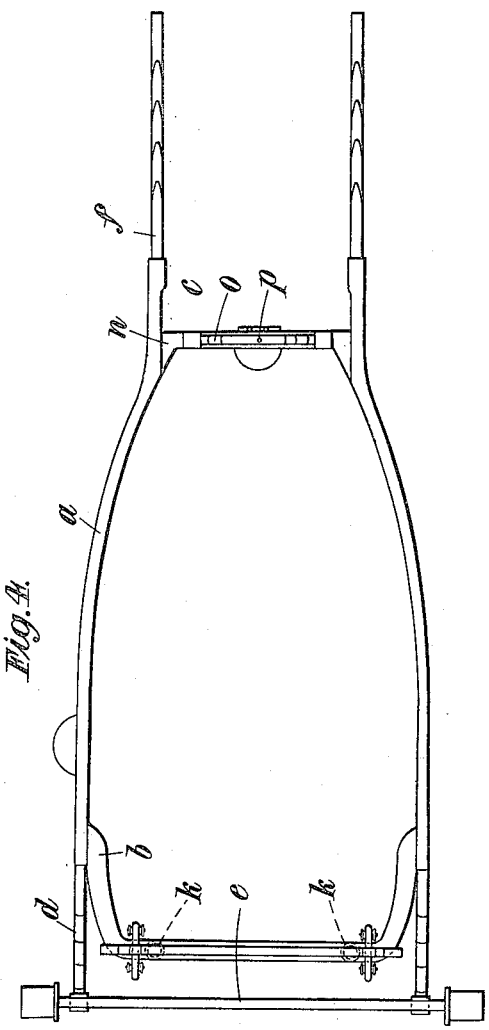
INVENTOR
Charles Louis Heyermans
BY
ATTORNEY

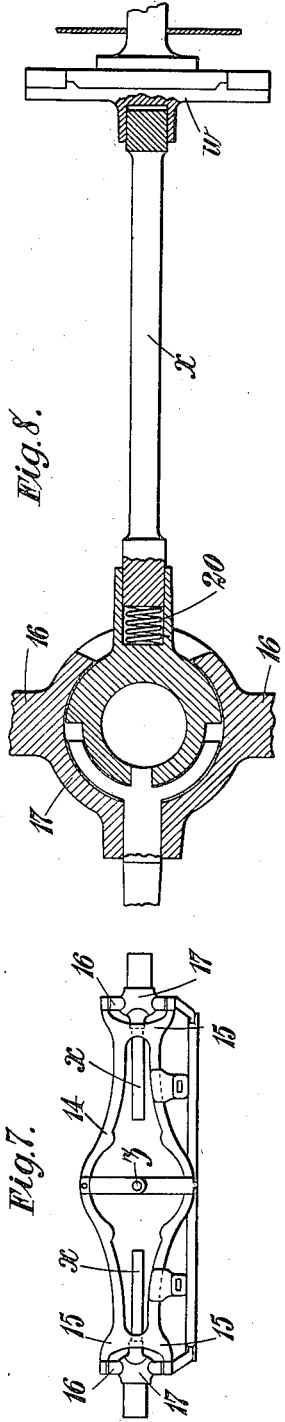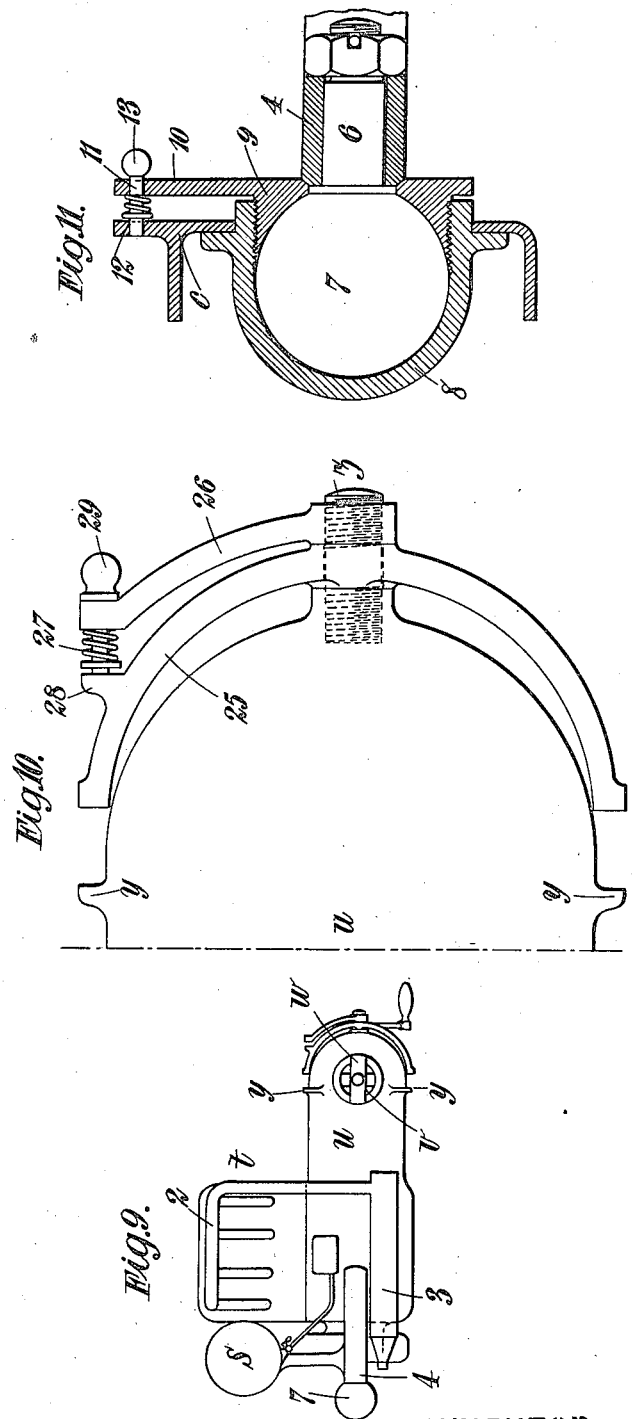

UNITED STATES PATENT OFFICE.

CHARLES LOUIS HEYERMANS, OF WEST KENSINGON, LONDON, ENGLAND.

SELF-PROPELLED VEHICLE.

1,305,105.   Specification of Letters Patent.   Patented May 27, 1919.

Application filed July 20, 1917.   Serial No. 181,753.

*To all whom it may concern:*

Be it known that I, CHARLES LOUIS HEYERMANS, a subject of the King of Belgium, of 17 Stanwick road, West Kensington, London, England, engineer, have invented certain new and useful Improvements in and Relating to Self-Propelled Vehicles, of which the following is a specification.

This invention relates to self-propelled vehicles such as motor cars, and more particularly to cars which are light in construction and often known as cycle cars.

Such cars are usually driven by the back axle which in turn is chain or otherwise driven from the engine transmission, and in some cases the back axle is "live" or directly driven. By such a system of drive the weight of the engine, the power transmission and other parts, together with all their vibration, are thrown on the chassis, so that it has to be accordingly of heavy and strong design. Moreover, the engine and the power transmission devices being assumed as permanent features, they are usually of such a nature that practically the whole car has to be dismantled to effect repairs and occasioning the car to be out of commission for a considerable time.

By the present invention a construction of car is contemplated by which the main frame or chassis being substantially relieved of the greater part of its usual load is made of maximum lightness and simplicity in design, and in which the engine and its power transmission elements are so arranged that it constitutes a complete tractor unit adapted to draw the car along in a manner resembling a horse-drawn vehicle or a manually drawn rickshaw. The parts of the car are also adapted by being made in detachable sections or units to be speedily taken apart for the purpose of convenient storage and quickly reassembled for use.

With the above objects in view, the engine, gear transmission, petrol tank, silencer and so forth are built up as a complete detachable unit and when operating is suspended between a carrying frame constituting at the same time the front axle and the front end of the car chassis, the point of attachment to the said chassis being constituted by a universal joint. A second unit comprises a light and simple chassis which at one end, in order that it may be adequately supported, carries projecting extensions which engage the front carrying frame or axle. The third unit is the body which is as light as is compatible with safety and endurance.

The engine drive is received on the axle and as the road wheels rotate they, by their tractive effort on the ground, pull the engine and car along through the medium of a yoke carried on the axle and embracing the end of the engine casing. Thus the engine and front axle constitute, as it were, one half of the vehicle, while the body, chassis and the other axle constitute the other half, these parts being connected together by a universal joint arranged at the front end of the chassis, one end of which is fitted with projecting extensions that are adapted to be supported by the axle or the yoke thereon. It will also be understood that when in operative position the engine unit is carried by the ground at two points through the medium of a pair of wheels and tires and attached by a universal joint at a third point to the chassis. Thus it is an essential characteristic that the engine unit rests on the ground at two points, and is carried at a third point from a cross member of the chassis, this suspension being rendered possible by the chassis having forward extensions taking their resting point on the carrying frame or yoke. Provision is also made to allow the engine unit and its pair of wheels to rise and fall due to inequalities of the road. By such a system the frame is exceedingly flexible, the front and back halves of the car being relatively movable by means of the universal joint and permitting the wheels to ride over obstructions or to facilitate banking and other unequal running.

The invention will now be described with reference to the accompanying drawings which illustrate by way of example a form of light car.

Figure 1 is a side elevation of the complete car.

Fig. 2 is a plan view.

Fig. 3 is a front elevation.

Fig. 4 is a plan view of the main chassis detached.

Fig. 5 is a side elevation of the car body detached.

Fig. 6 is a detail hereinafter referred to.

Fig. 7 is an elevation of the front axle and a yoke combined therewith.

Fig. 8 is an elevation partly in section of one member of the front axle.

Fig. 9 is an elevation of the engine unit detached.

Fig. 10 is an elevation on an enlarged scale of the means employed for supporting and locking the end of the engine unit on the front axle, and Fig. 11 is a sectional view of a universal joint and its mounting, hereinafter referred to.

In carrying the invention into effect, $a$ is the main chassis or frame which, as will be seen in Fig. 4, is of exceedingly light and simple construction and carries toward its back and front ends cross members $b$ and $c$ respectively. It has at its back end a pair of laminated springs $d$ which at the outer ends engage with the back axle $e$. The front end of the chassis $a$ has forwardly projecting extensions or shafts composed in the present example of laminated springs $f$. The chassis is made of steel as is usual and is of suitable cross-section, and the front ends of the projecting spring extensions $f$ engage with a front carrying frame hereinafter described. The cross member $b$ at the rear end is adapted to support the back of the car body $g$ at two points by means of telescopic members $h$, one of which is shown in Fig. 6, and springs $k$, these devices acting in conjunction with a rod $l$, the ends of which engage with eyes or lugs $m$, on the body $g$, one of which eyes is shown in Figs. 5 and 6. To support the front end of the body, the cross member $c$ is provided as shown in Fig. 11, attached in any suitable way to the longitudinal side members as by brackets $n$, and upon the cross member a laminated spring $o$ is mounted, the crown of the spring having a hole $p$ to receive a pin $q$ carried by a projecting shoulder piece $r$ on the car body.

By the above described construction, the car body is supported at three points by the chassis. The body is very light in character and simple in design, and is preferably made of three ply wood or other material, and its front end is recessed as shown in Fig. 1 to accommodate parts of the engine and a petrol tank $s$.

To propel the car, a driving unit is arranged in front, and comprises the engine and its accessories, a two-part front axle, a yoke member, and a pair of wheels which will now be described in detail.

The engine and its accessories, which are shown detached in Fig. 9, comprise the engine and crank casing indicated generally by $t$, which casing is forwardly extended at $u$ to contain any usual and suitable speed transmission, such as two speeds and a reverse. The front end is of spherical form and openings $v$ are left in the sides with bearings $w$, which each receive one member $x$ of a two part front axle, (see Fig. 7). A pair of shoulder pieces or lugs $y$ are left on the casing $u$ at the top and bottom, while a screw threaded stud $z$ is secured centrally in the spherical end. These parts are clearly indicated in the large scale drawing Fig. 10. The engine exhaust pipe is shown at 2, leading to the usual silencer 3, and the crank casing $t$ carries at each side the ends of a frame 4 for a purpose hereinafter described, such frame also serving to support the petrol tank $s$ by means of suitable brackets. The engine is air cooled, a constant passage of cold air being induced through openings toward the upper end of an engine inclosing casing by means of a fan 5 which is mounted on the end of the crank shaft and accommodated within the space afforded by the frame 4. The engine unit above described is attached to the front end of the chassis $a$ by means of a universal joint which is illustrated in sectional detail in Fig. 11. Passing centrally through the frame 4 is a bolt 6, which carries a spherical head 7, the bolt being tightened in position by a nut on the inner side of frame 4. The spherical head is received by a socket 8 carried on the cross member $c$ of the chassis. To lock the spherical head in working position, a locking ring 9 is used which has an inner spherical face to closely fit the head, which ring is screwed within the socket 8 and abuts upon the end surface of the frame 4. To insure a speedy and instant connection or disconnection of the universal joint, the screw thread on the locking ring 9 and its coöperating thread within the socket 8, are both of interrupted form and resemble a breech block screw, so that locking or unlocking can be effected by a single movement of part rotation, for example, an eighth of a revolution. To enable this to be conveniently effected, the locking ring 9 carries an arm 10 whose outer end in its turn is locked by a spring mounted pin 11 therein, adapted to take into one of a number of locking holes 12 on the cross member of the chassis. When operating the device the pin 11 is withdrawn by its knob 13, thus unlocking the arm 10 which may then be moved to such an extent as will disengage the screw-threaded sections and thus allow the engine unit, the spherical head, the frame 4, and the locking arm to be bodily withdrawn.

The front end of the engine is carried by a yoke 14 which comprises a central portion of circular form which is adapted to receive and fit upon the spherical end of the engine casing $u$, the side portions of the yoke ending in arms 15 that fit upon projections 16 of ball jointed wheel hubs 17, to each of which hubs there is also connected one end of a shaft $x$, the other end of each shaft fitting the bearing $w$ in the side of the engine casing, which is thus arranged midway between the two shafts $x$. The latter carries squared or other shaped ends to transmit the engine drive to the front wheels 19 carried in the usual way upon the ball jointed hubs 17. Each of the shafts $x$ are made detachable from its end support and to permit this, a spring 20 is interposed between its end and the corresponding ball jointed hub, and by compressing the spring, sufficient movement is obtained to move its other end clear of its bearing, and allow the whole shaft to be removed. The universal hubs are fitted with the usual radius members 21 connected by a cross rod 22 so that steering may be effected in the usual way. Lugs or buckles 23 slotted at 24 are adapted to engage the ends of the spring extensions $f$ from the chassis. The front end of the engine casing is connected with the yoke 14 in a manner similar to that which is used for attaching its back end to the chassis, and for this purpose a semi-circular cross member 25, in detail Fig. 10, is fitted upon the stud $z$ which, at its outer end, is made with an interrupted screw thread, for engaging a similar thread in one end of a locking arm 26. The front end of the engine casing extends within the central circular frame of the yoke 14 up to the shoulders $y$ and the free ends of the cross member 25 abut against the front face of the yoke to retain the engine in position. The outer end of the locking arm 26 carries a spring pressed bolt 27 adapted to engage with one of a number of locking holes formed in a lug 28 projecting from the cross member 26. To secure the front end of the engine casing in position in the yoke 14, after it is positioned within the circular central portion of the yoke, against the shoulders $y$, the cross piece 25 is slipped on to the stud $z$ and followed up by the locking arm 26, and a short rotational movement of the latter will cause the interrupted screw portions to interengage, which will then be locked by means of the bolt 27. For convenient manipulation in unlocking, the bolt carries a head 29.

If the parts which are shown detached in Figs. 4 to 11 are to be put together, the engine unit is placed in correct juxtaposition to the frame or chassis, it being supported at the proper height by means of a block of wood, for instance. Its front end is then connected to the yoke 14 by means of the cross member 25 and the interrupted screw thread device and locked by the arm 26. The ends of the spring extensions $f$ are then inserted in the buckles 23, while at the same time the spherical head 7 enters the socket 8. These parts are then locked by a suitable movement of the arm 10, which acts upon the locking ring 9. The complete chassis is now assembled.

The engine is then connected to the ball jointed wheel hubs 17 by means of the members $x$ of the two-part front axle, which members are inserted by compressing the spring 20 with the outer end of the shaft and then allowing the inner end to enter the corresponding socket. When this has been done with both members, the engine unit is in driving connection with the road wheels. The body is then mounted in position upon the chassis, the pin $q$ on the shoulder piece $r$ of the body engaging the hole $p$ of the laminated cross spring $o$. The usual starting handle 30 is arranged at the front end of the engine unit as shown in Fig. 1.

It will be appreciated that the ends of the spring extensions $f$ having a sliding engagement with the buckles 23, and the spherical head 7 having a swiveling action, will allow either end of the front axle carrying frame to rise and fall relatively to the body unit independently of the other end, while further the connection between the engine unit and the frame is such as to keep the general plane of the latter substantially vertical. Moreover, it is to be understood that any other means of connection than those shown may be provided between the engine unit and the axle carrying frame to which it is secured, and the extensions $f$ of the chassis. For example, instead of providing for the propelling force to be transmitted through the engine unit, ball jointed ties may be employed connecting the axle carrying frame to the body unit and the spherical joint 7 may be arranged upon a block sliding between guides in the fore and aft direction and the ends of the extensions $f$ arranged to make sliding engagement as already described, with the buckles 23. Alternatively to this last detail the outer ends of the extensions may be secured to the axle carrying frame and their inner ends arranged to have sliding movement relatively to the body unit. Again the extensions may be so secured both to the axle carrying frame and to the body unit that they transmit the propelling effort, in which case the spherical joint 7 is arranged to slide in guides in the fore and aft direction upon the body unit, and ties having ball jointed ends may be arranged in the same vertical plane as that containing the spherical joint 7. Furthermore the construction may alternatively be so made that the front axle frame is secured to the outer ends of the extensions to secure this frame to the body unit, and transmission provided between the engine and the rear axle and thus constitute the rear wheels the driving wheels, a ball joint device being provided between the rear axle and the engine, the rear axle being given a sliding connection with the chassis.

It will appear from the foregoing that a principal advantage of the above-described invention is to enable vehicles of the kind in question to be so built that they can be easily and rapidly taken to pieces and put together again, and moreover, that comparatively little space is occupied when so taken to pieces. Moreover the car is of very light construction.

Having now described my invention, what I claim as new and desire to secure by Letters Patent is:—

1. A self-propelled vehicle comprising in combination a vehicle main chassis with car body thereon a wheeled front carrying frame and an engine unit not only suspended between the main chassis and front carrying frame, but movable relatively to the main chassis.

2. A self propelled vehicle comprising a wheeled main chassis supporting a car body, a wheeled front axle, an engine and transmission unit suspended between the said front axle and main chassis, and means whereby the said unit together with the front axle and wheels are adapted to move freely relatively to the frame to compensate for all inequalities of the road.

3. A self propelled vehicle comprising in combination, a two wheeled main chassis with car body thereon, a two wheeled front carrying frame, an engine unit, means for suspending the front end of the unit from the front carrying frame a universal joint for suspending its back end from the main chassis and extensions of the latter yieldingly engaging the front carrying frame.

4. A self propelled vehicle comprising in combination a two wheeled main chassis with car body thereon, a two wheeled front carrying frame, an engine unit, means for suspending the front end of the unit from the front carrying frame, a universal joint for suspending its back end from the main chassis, and freely yielding means provided between the carrying frame and the main chassis to allow either side of the frame to move relatively to its other end, or rise and fall in a curved path.

5. A self propelled vehicle comprising in combination, a two wheeled main chassis with a car body thereon, a two-wheeled front carrying frame, an engine unit suspended between the main chassis and front carrying frame, and means whereby the said frame with its wheels and the power driving unit are instantly detachable from the chassis.

6. A self-propelled vehicle comprising in combination, a two wheeled main chassis with car body thereon, a two wheeled front carrying frame, an engine unit, means for suspending the front end of the unit from the front carrying frame, a universal joint for suspending its back end from the main chassis, extensions of the latter yieldingly engaging the front frame, and means whereby the universal joint connection is instantly detachable in order that the front carrying frame together with an engine unit may be quickly and bodily removed.

7. A self propelled vehicle comprising in combination a two wheeled main chassis with a car body thereon, a pair of front wheels and an axle, a yoke member carried by the hubs of the said front wheels, an engine unit, between the main chassis and the front wheels, a universal joint for suspending one end of the unit from one end of the main chassis and instantly detachable means for suspending the other end of the unit from said yoke member.

8. A self-propelled vehicle comprising in combination a two-wheeled main chassis with a car body thereon, a pair of front wheels and an axle, a yoke member carried by the hubs of the said front wheels, an engine unit between the main chassis and the front wheels, a universal joint for suspending one end of the unit from one end of the main chassis, interrupted screw thread means for fixing the joint in position and also for suspending the other end of the unit from said yoke member, and locking means for both of the said screw interrupted means.

9. A self propelled vehicle comprising in combination a main chassis, a wheeled axle for supporting the back end thereof upon the road, a front carrying frame, an engine unit suspended between said frame and the main chassis, and spring extensions extending from the main chassis to the front frame and having slidable engagements therewith in order that the front end of the main chassis may be supported.

10. A self propelled vehicle comprising in combination a main chassis, a wheeled back axle therefor, a spring bearing between the axle and chassis, a front wheeled carrying frame, an engine unit suspended between said frame and the chassis, and spring extensions extending from the main chassis bearing freely at their free ends upon the carrying frame.

11. A self propelled vehicle comprising in combination a main chassis, a wheeled back axle therefor, a spring bearing between the axle and chassis, a pair of front wheels angular sockets in the hubs thereof, a two part axle each part comprising a shaft portion with angular ends for engagement at one end with the said sockets, an engine unit between the main chassis and front axle and driven angular sockets in said unit for engagement with the other ends of the said shaft portions, which together comprise the two part front axle.

In testimony whereof I have signed my name to this specification.

CHARLES LOUIS HEYERMANS.